July 3, 1945.  E. L. HADDEN  2,379,517
UNIVERSAL INDICATOR FOR REMOTE CONTROL DECK SOCKETS
Filed Dec. 31, 1943  2 Sheets-Sheet 2
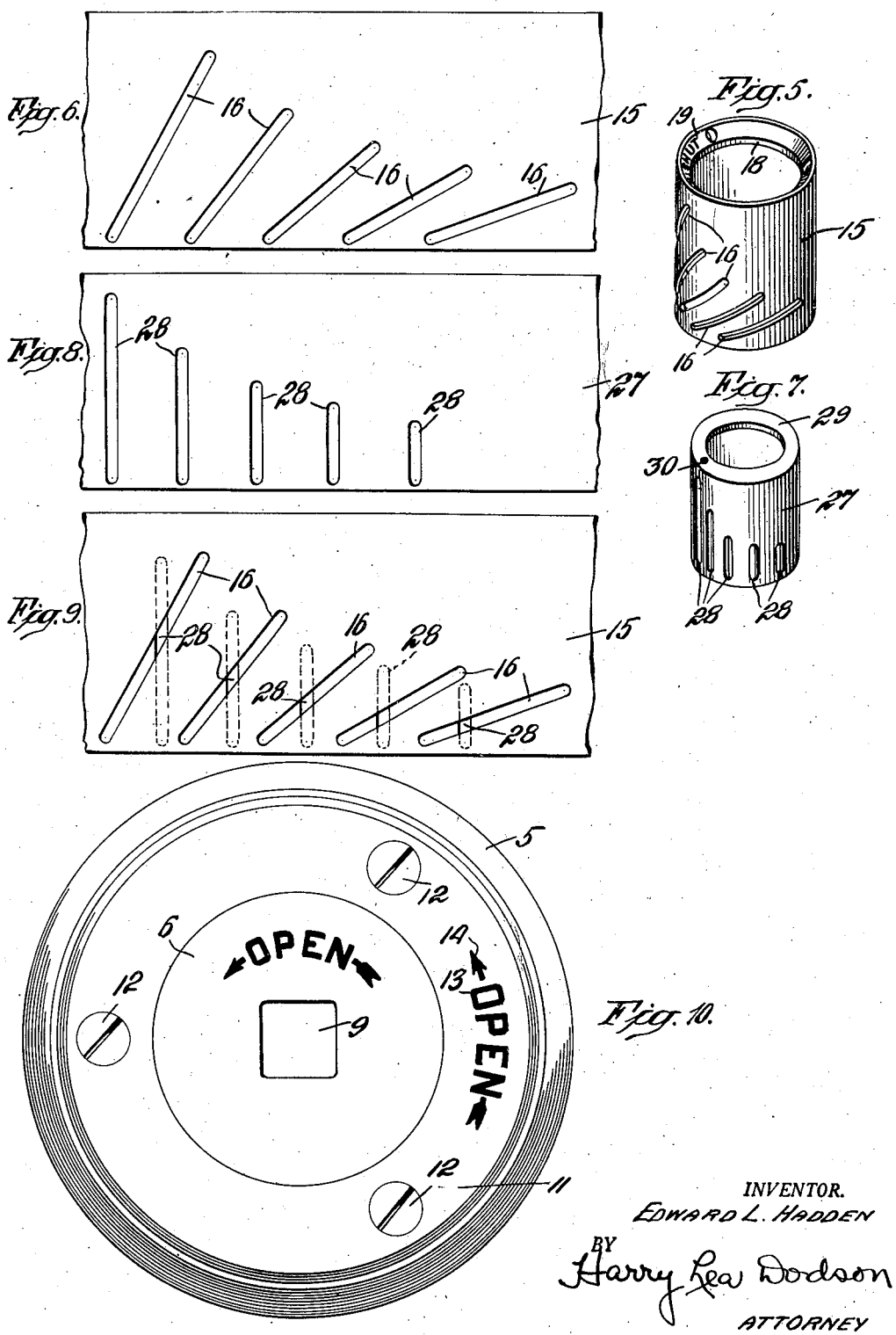
INVENTOR.
EDWARD L. HADDEN
BY
Harry Lea Dodson
ATTORNEY Patented July 3, 1945

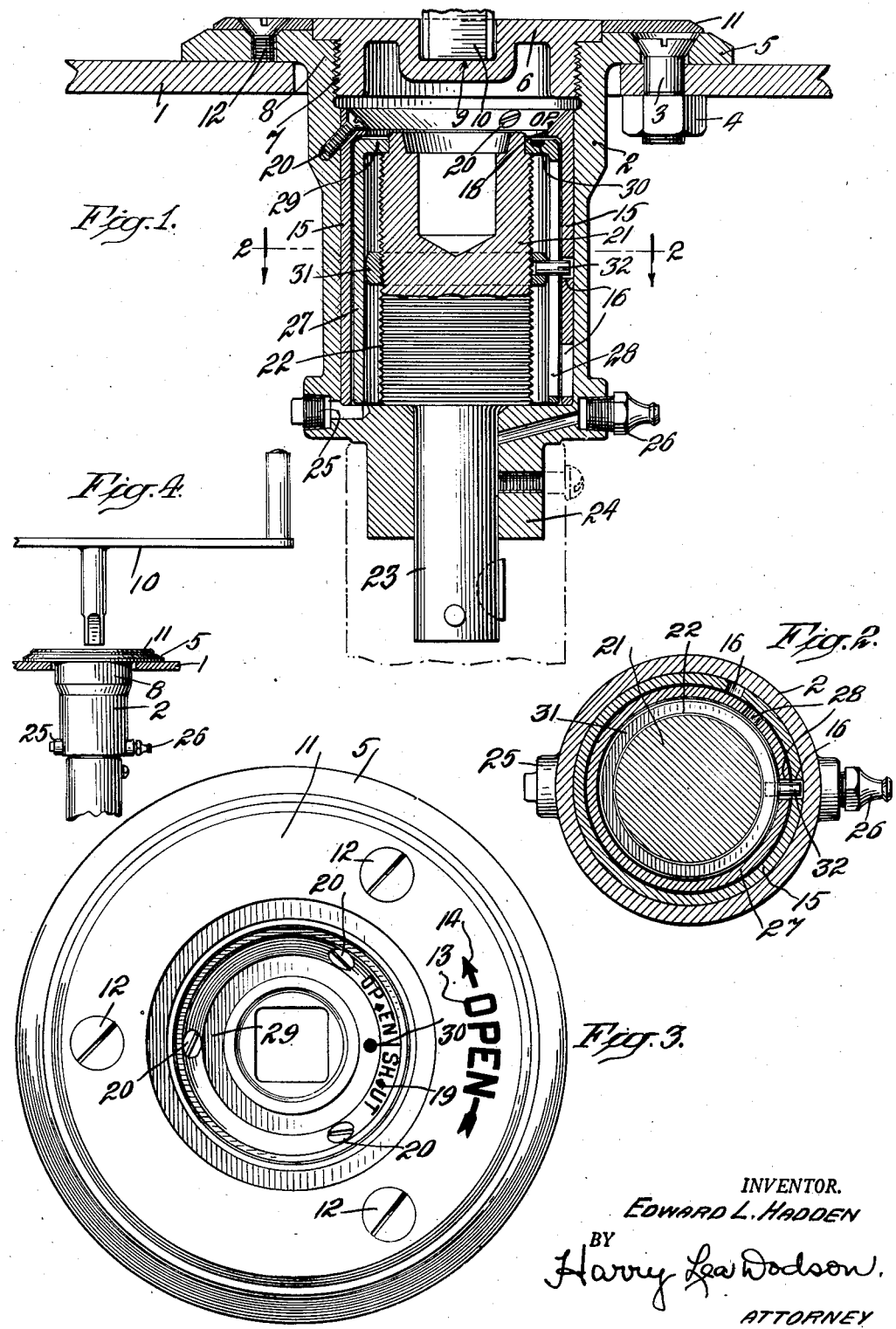

2,379,517

UNITED STATES PATENT OFFICE 2,379,517

UNIVERSAL INDICATOR FOR REMOTE CONTROL DECK SOCKETS

Edward L. Hadden, Plainfield, N. J., assignor to Gibbs & Cox, Inc., New York, N. Y., a corporation of New York Application December 31, 1943, Serial No. 516,358

11 Claims. (Cl. 116—125)

My invention relates to indicators designed to show by visible indicia the open or closed position of a valve, and more particularly to the deck socket type of operating gear which is used on ships generally to control remote valves.

I am aware that there are devices in the prior art for this purpose. They are all however subject to certain objections which my invention is designed to overcome.

For example, the most commonly used one consists of a housing sunk below the plane of the deck and the indicator consists of an indicator nut, mounted on the threads of the spindle, which moves axially upon the threads. The rotation of the spindle necessarily causes the indicator nut to travel down into and/or up out of the housing as the case may be.

The result is that in order to read the open and shut positions of the valve it is necessary to judge when the nut is opposite the open and shut indicia since it travels axially toward and away from the operator. Accurate estimation of the position of the nut under this condition, is so difficult as to be almost impossible.

Another serious objection which exists in this arrangement is that due to the axial movement of the indicator nut into the housing the ability of the operator to see the indicator nut is constantly diminished because of the darkened condition at the innermost end of the housing. As the light of the space into which the housing opens can not penetrate past the spindle and into the depth of the housing where exists an extreme point of indication, it is necessary to use a flashlight or other portable light source to see by.

Another serious objection is the fact that dust and dirt accumulate in the housing rendering the reading difficult until the debris is removed. Inasmuch as these remote controls are generally for emergency use every such delay is very objectionable.

Another class of indicators to show the open or closed position of a remote valve is illustrated by United States Patent to Vincent No. 819,185. This patent, as do all of its class, displays the indicia in a position where it can only be read from the side, obviously such construction can not be used in a deck socket type of operating gear as it would be practically impossible to read it. Moreover, in the construction shown by the Vincent patent the translation of the axial motion into rotary motion causes undue friction.

Another objectionable feature is that it requires a considerable amount of work before the device can be used since the cams must be set for each job.

My invention has for its object to avoid or overcome all of the objectionable features of the prior art by providing a remote valve control of the deck socket type, which provides for mechanical translation of movement from rotary to axial and back to a partial rotary movement.

A further object of my invention is to provide a device for the purpose, in which the plane of movement of the indicia is at right angles to the axis of the spindle and hence is across the operator's field of vision.

A further object is to locate the indicia or place of reading near the top or open end of the housing where the light in the surrounding space can illuminate it to the greatest advantage.

These advantages aid the person who operates the apparatus during the emergencies for which it is intended thereby increasing his efficiency.

A further object is to attain these objects by translating the rotary movement to axial movement and back to a partial rotary movement in a manner which is compact and uses a minimum number of parts exclusive of fastenings. This compactness is designed into the indicator by means of "nesting." The parts are concentrically "nested" thereby using only as much space as is necessary for the provision of sufficient material to resist wear and the provision of space necessary for reasonable clearance between the moving parts for permitting free movement, axial, rotary and helical.

It will appear from the hereinafter contained description that my universal indicator consists of a water-tight housing with a screwed cap, a stationary sleeve with helical slots, an oscillating sleeve with corresponding vertical slots which is nested inside the stationary sleeve, a socket-head threaded spindle, and a nut with a pin in its side at right angles to the axis of the nut. The pin protrudes first through a vertical slot in the oscillating sleeve and next into the corresponding slot in the stationary sleeve. The housing has a bearing at its lower end which accommodates the stem of the spindle. It is to this protruding stem that a shaft is fixed connecting the indicator unit to a valve or other apparatus to be remotely controlled.

A further object is to provide means for accelerating the movement of the oscillating or rotary sleeve.

A further object is to provide a spindle having a recess at the top, this provides an unstressed metal ring to bind together the shell left between the square hole and the outside of the spindle to protect the end of the spindle from splitting due to excessive torque or the tilting of the operating crank, which may subject the end of the spindle to inordinate stress.

A more positive and self-centering means of inserting the operating crank due to its funnel-like design, and, a buffer surface to protect the oscillating sleeve from damage if the crank is carelessly inserted in the socket of the spindle.

My means of accomplishing the foregoing objects may be more readily understood by reference to the accompanying drawings which are hereunto annexed and form a part of this application in which:

Fig. 1 is a vertical sectional view of my improved device some of the parts being shown in elevation;

Fig. 2 is a cross-section on the line 2—2 in Fig. 1;

Fig. 3 is a top or plan view of my device with the cover removed showing the indicia;

Fig. 4 is a detail view of the operating means;

Fig. 5 is a perspective view of the stationary sleeve on a reduced scale;

Fig. 6 is an expanded view of this sleeve;

Fig. 7 is a perspective view of the oscillating sleeve on a reduced scale;

Fig. 8 is an expanded view of this sleeve;

Fig. 9 is an expanded view with the stationary sleeve superimposed on the oscillating sleeve;

Fig. 10 is a top or plan view with the cover in place.

Similar reference numerals refer to similar parts throughout the entire specification.

As shown in the drawings a fragmentary portion 1, of a deck is shown. A cylindrical housing 2 is recessed into the deck 1, and secured in place by screws 3, which pass through holes in a circumferential flange 5 at the top of the housing 2. The screws may be held in place by nuts 4. If needed a gasket (not shown) may be placed between the flange 5 and the deck 1, to render its water proof. A cover 6 is fitted to internal threads 7 cut in the wall 8 of the housing 2. This cover 6 may be provided with a square socket 9 at its center for the reception of a wrench 10. Any other convenient form of unscrewing the cover may be employed. An annular label plate 11 is secured to the flange 5 by means of screws 12, and may bear the word (13) "open" and an arrow 14.

A stationary sleeve 15 which is provided with one or more helical slots 16 is mounted in the housing. It has an inwardly extending flange 18 the inner wall of which preferably tapers downwardly and inwardly and bears the words (19) "open" and "shut." Screws 20 pass through the flange 18 and into the housing to hold the sleeve stationary. An oscillating sleeve 27 is nested in the stationary sleeve 15. The sleeve 27 is provided with one or more vertical slots 28 adapted to register with the helical slots in the sleeve 15. A dot 30 or other desired marking is located on the flange 29 adapted to register with a line placed between the words "open" and "shut" on the flange 18 of the stationary sleeve 15, see Fig. 3.

A spindle 21 which has an enlarged threaded portion 22 and a reduced neck or stem 23 is mounted in a bearing 24 at the lower end of the housing 2. Spindle 21 has a circular shoulder 21' located at the upper end of the threaded portion 22 of said spindle 21, this shoulder 21' serving as a support for the flange 29 of the oscillating sleeve 27. When the spindle rotates, the frictional engagement between the shoulder 21' and the flange 29 of said oscillating sleeve 27 causes partial rotation of said sleeve until its further rotation is stopped by the engagement of the pin 32 with a wall of the slot 28. A drain connection 25 is formed at the lower end of the housing 2 and a grease gun fitting 26 is mounted in the bearing for lubricating purposes. This fitting 26 should be removed when installing the device. An annular nut 31 is mounted upon the threaded portion 22 of the spindle. This nut 31 has a radially extending pin 32 which extends through a vertical slot in the oscillating sleeve 27 and into a corresponding helical slot 16 in the stationary sleeve 15. The outside surface of this nut 31 is partially spherical, this enables it to act as a secondary bearing for the oscillating sleeve 27, as it fits with reasonable closeness. I make this surface spherical so as to permit the nut 31 to be tilted when assembling so that the projecting pin 32 may be introduced into the selected slots.

I have shown a plurality of slots in both sleeves. I have found this very desirable owing to the fact that due to the war emergency it is not positively known beforehand just which manufacturer's valve is to be supplied for a given service. Therefore, the number of turns to "open" or "shut" the valve is not known. It is the common practice now to machine the indicator threads and locate the indicator markings to suit the valve actually used for a given service after the valve is installed in the ship, and the indicator computations can be made. This causes the difficulty of tailoring each indicator to suit its own valve thereby increasing the time and cost of installing the deck socket. Since the spindle which has indicator threads is a major part of the deck socket, the operating gear could not even be installed until the computations are completed and the necessary machining accomplished.

By providing the sleeves with a plurality of helical and corresponding vertical slots I overcome this difficulty because of the wide selection of operating ranges, any one of which gives approximately the same reading for any valve whose number of turns falls within the maximum range. It will be clear that my device can be completed with the exception of the installation of it in the ship, and the connection to the valve. The indicator range to be used can be selected after installation and correctly assembled in a very few minutes thereby saving time and cost. This is true because there is a plurality of slots at different helix angles to each other with their corresponding vertical slots, each pair of slots cover a part of the over-all range of the indicator. The maximum capacities of different sizes of indicators are assumed to be reasonably well above the number of turns of a valve, which would normally be operated by each specific size. By dividing the maximum range of turns into groups one group for each pair of slots it is possible to obtain approximately the same reading for "open" and "shut" anywhere between the maximum and minimum specified for the indicator. This permits the manufacture of standard units which can easily be assembled "on the job" to suit apparatus having a variety of turns from "open" to "shut" thus eliminating the "tailoring" of each indicator to its valve. Due to war conditions it is not necessarily known beforehand what valve will be furnished to the ship, therefore the exact number of turns is not known beforehand.

The operation is as follows—

It will be apparent to persons skilled in the art that the indicator nut 31 with pin 32 rides up and down on the spindle threads 22 as the valve (not shown) or other apparatus is operated and the pin 32, due to the helical slot 16 moves clockwise and counter-clockwise. The helical path taken by the pin 32 guides the oscillating sleeve 27 so that the index mark or dot 30 registers the "open" and "shut" positions of the valve or other apparatus. The stationary sleeve 15 is fastened to the housing 2 and bears marks for the "open" and "shut" positions which register with a mark or dot on the oscillating sleeve 27'. The oscillating sleeve 27' should be held in a constant axial position. The indicator nut 31 derives its vertical movement from the rotation of the spindle 21 which raises or lowers the nut on the threads 22. The projecting pin 32, by means of the helical slots 16 in the stationary sleeve 15, causes the nut 31 also to oscillate from the "open" to the "shut" position as the nut 31 is raised or lowered. From the foregoing description it will be seen that the sleeve 27 is only partially rotated and that this is also true of the nut 31. The partial rotation of the nut 31 is due to the frictional engagement of its threads with those of the spindle. This partial rotation continues until the pin 32 contacts one wall of the helical slot 16 in the stationary sleeve, at which point the nut will start on its upward travel while still continuing its partial rotation. It will be clear to those skilled in the art that the spindle imparts partial rotation to both the oscillating sleeve and the annular threaded nut 31 due to the frictional engagement of these parts with the spindle and this partial movement will continue until the pin strikes one wall of a helical slot 16 in the stationary sleeve 15 upon which it rides as the pin describes its helix upwardly or downwardly dependent upon the direction of rotation of the spindle. When this occurs the sleeve 27 will continue its partial rotation until the trailing wall of the vertical slot contacts pin 32 when its further rotation ceases until additional rotation is permitted by movement of the pin upwardly. During this period the frictional engagement of the flange 29 with the shoulder 21' will rotate the sleeve 27 until all rotary movement of both nut 31 and sleeve 27 is prevented by the pin 32 reaching the upper or lower end of the helical slot in which it is traveling. The upward movement of the pin 32 along the wall of the slot 16 is facilitated by the pressure of the trailing wall of slot 28 as the sleeve is rotated by movement of the spindle.

It will be clear to those skilled in the art that my device is not limited to ships, for this combination of mechanical movements is adaptable for indicating purposes in ships, refineries, power plants etc.

Having described my invention what I regard as new and desire to secure by Letters Patent is:

1. An adjustable indicator for remote control of valves; comprising, a housing, a shouldered spindle in said housing, threads on said spindle, a stationary member mounted in a plane at right angles to the axis of the spindle having indicia thereon cooperating with an indicator, a sleeve integral with said stationary member mounted in said housing, an oscillatory sleeve nested in the stationary sleeve, there being registering slots in said sleeves, a flange at the top of the oscillatory sleeve which rests on the shoulder of the spindle, the frictional engagement between said flange and shoulder serving to cause the oscillatory sleeve to rotate with the spindle, said flange having an indicator at its top adapted to register with said indicia, a longitudinally and rotatably movable ring mounted on the threads on said spindle, and means on said ring engaging the slots in both sleeves, said means being actuated by the movement of the spindle to limit oscillation of said oscillatory sleeve.

2. An adjustable indicator for remote control of valves; comprising, a housing, a threaded spindle in said housing, a stationary sleeve in said housing having a plate at its upper end in a plane at right angles to the axis of said spindle and adjacent the open end of the housing, said plate having visible indicia thereon, helical slots in said sleeve, an oscillating sleeve inside said stationary sleeve having vertical slots which register with the helical slots in the stationary sleeve, a movable indicator carried by said oscillating sleeve in a plane parallel with the indicia, means on said oscillating sleeve which frictionally engages said spindle to move said indicator as the valve is opened or closed, and means mounted on the threads on the spindle which engages a vertical and a helical slot.

3. An adjustable indicator for remote control of valves; comprising, a housing, a shouldered spindle in said housing, threads in said spindle, a stationary member mounted in a plane at right angles to the axis of the spindle having indicia thereon cooperating with an indicator, a sleeve in said housing integral with the stationary member and having a plurality of helical slots in its wall, an oscillatory sleeve, a flange at its top which rests on the shoulder on said spindle said sleeves and spindle being concentric, said flange having an indicator at its top adapted to register with said indicia, said oscillatory sleeve, having a plurality of vertical slots which register with said helical slots, a longitudinally movable ring mounted on the threads on said spindle, a pin carried by said ring which extends through a vertical slot and into a helical slot, the frictional engagement between said flange and shoulder serving to cause said oscillatory sleeve to rotate, whereby when the spindle is rotated the indicator will be moved to show the position of the valve.

4. An adjustable indicator for remote control of valves; comprising, a housing, a shouldered spindle in said housing, threads on said spindle, a stationary member mounted in a plane at right angles to the axis of the spindle having indicia thereon cooperating with an indicator, a sleeve in said housing integral with the stationary member and having a helical slot in its wall, an oscillatory sleeve having a vertical slot in its wall which registers with said helical slot said sleeves and spindle being concentric, means on said oscillatory sleeve to frictionally engage said shoulder, an indicator at the top of said sleeve adapted to register with said indicia, a longitudinally movable ring mounted on the threads on said spindle, a pin carried by said ring which extends through the vertical and into the helical slot, the frictional engagement between said flange and shoulder serving to cause said oscillatory sleeve to rotate, whereby when the spindle is rotated the indicator will be moved to show the position of the valve.

5. An adjustable indicator for remote control of valves; comprising, a housing, a cover for said housing, a rotatable spindle mounted in said housing, a stationary member mounted in a plane at right angles to the axis of the spindle having indicia thereon cooperating with an indicator, said spindle having a threaded portion, a shoulder on said spindle at the upper end of said threaded portion, a ring having a partially spherical outer surface mounted on said threads, a sleeve integral with said stationary member and nested in said housing, there being helical slots in its wall, an oscillatory sleeve nested in said stationary sleeve, there being vertical slots in its wall adapted to register with the helical slots, a radially projecting pin on said ring which projects through a vertical slot and into a helical slot, a flange at the top of said oscillatory sleeve which rests upon the shoulder on said spindle, said flange having an indicator which registers with the indicia whereby when the spindle is rotated the indicator will show the position of the valve.

6. An adjustable indicator for remote control of valves; comprising, a housing, a cover for said housing, a rotatable spindle mounted in said housing, said spindle having a threaded portion, a shoulder at the top of said threaded portion, a member having a partially spherical outer surface mounted on said threads, a stationary member mounted in a plane at right angles to the axis of the spindle having indicia thereon, a sleeve integral with said stationary member and nested in said housing, there being a helical slot in its wall, an oscillatory sleeve in said stationary sleeve, there being a vertical slot in its wall adapted to register with the helical slot, a radially projecting pin on said member which projects through a vertical slot and into a helical slot, and a flange at the top of said oscillatory sleeve which rests upon the shoulder on said spindle, said flange having an indicator which registers with the indicia, whereby when the spindle is rotated the indicator will show the position of the valve.

7. An adjustable indicator for remote control of valves; comprising, a housing, a cover for said housing, a rotatable spindle mounted in said housing, a stationary member having indicia thereon mounted in a plane at right angles to the axis of the spindle, said spindle having a threaded portion, a shoulder on said spindle at the top of said threaded portion, a member having a partially spherical outer surface mounted on said threads, a sleeve integral with said stationary member and nested in said housing, there being a helical slot in its wall, an oscillatory sleeve nested in said stationary sleeve, there being a vertical slot in its wall adapted to register with the helical slot, means carried by said threaded member which engages registering slots, a flange on the top of said oscillatory sleeve, which rests on the shoulder on said spindle, said flange having an indicator which registers with the indicia, whereby when the spindle is rotated the indicator will show the position of the valve.

8. An adjustable indicator for remote control of valves; comprising, a housing, a cover for said housing, a rotatable spindle mounted in said housing, a stationary member mounted in a plane at right angles to the axis of the spindle having indicia thereon cooperating with an indicator, said spindle having a threaded portion, a shoulder at the top of said threaded portion, a member having a partially spherical outer surface mounted on said threads, a sleeve integral with said stationary member and nested in said housing, there being a helical slot in its wall, an oscillatory sleeve in said stationary sleeve, there being a vertical slot in its wall adapted to register with the helical slot, an upwardly extending flange at the top of said oscillatory sleeve, means carried by said member which engages registering slots, and an indicator at the top of said oscillatory sleeve which registers with said indicia a flange at the top of said oscillatory sleeve, the frictional engagement between said flange and said shoulder serving to cause said sleeve to rotate; whereby when the spindle is rotated the indicator will show the position of the valve.

9. An adjustable indicator for remote control of valves; comprising, a housing, a horizontal flange at the top of said housing, a plate mounted on said flange, a cover for said housing, a threaded spindle rotatably mounted in said housing, a member mounted on said threaded spindle, the outer surface of which is partially spherical, a pair of nesting sleeves mounted in said housing one of which is stationary, the other oscillates, there being respectively helical and vertical registering slots in said sleeves, a flange at the top of the stationary sleeve in a plane at right angles to the axis of the spindle, indicia on said flange, an indicator which registers with said indicia carried by the oscillating sleeve, means on said sleeve to frictionally engage said spindle, and means on said member which coacts with the slots in said sleeve to guide the indicator proportionally as the valve is opened or closed.

10. An adjustable indicator for remote control of valves; comprising, a housing, a rotatable threaded spindle in said housing, a stationary member in a plane at right angles to the axis of said spindle, indicia thereon which cooperates with an indicator, a sleeve in said housing integral with said stationary member having helical slots therein, an oscillatory sleeve, said sleeve and spindle being concentric, means on said oscillatory sleeve to frictionally engage said spindle, said means having an indicator adapted to register with said indicia, said oscillatory sleeve having vertical slots therein, a rotatable member mounted on said threads which is frictionally rotated and vertically moved by said threads, and means on said member which engages a vertical and a helical slot, said means being actuated by the movement of the spindle to limit oscillation of said oscillatory sleeve.

11. An adjustable indicator for remote control of valves; comprising, a housing, a shouldered spindle in said housing, a stationary member having indicia thereon cooperating with an indicator, a sleeve in said housing integral with said stationary member and having helical slots therein, an oscillatory sleeve having vertical slots therein said sleeve and spindle being concentric, a flange at the top of said oscillatory sleeve which rests on the shoulder on the spindle, said flange having an indicator at its top adapted to register with the indicia on the stationary member, a longitudinally movable ring mounted on the threads on said spindle, the frictional engagement between said flange and said shoulder serving to cause said sleeve to partially rotate, means on said ring which engages a vertical and a helical slot, said means actuated by the movement of the spindle to limit oscillation of said oscillatory sleeve.

EDWARD L. HADDEN.